Figure 2:
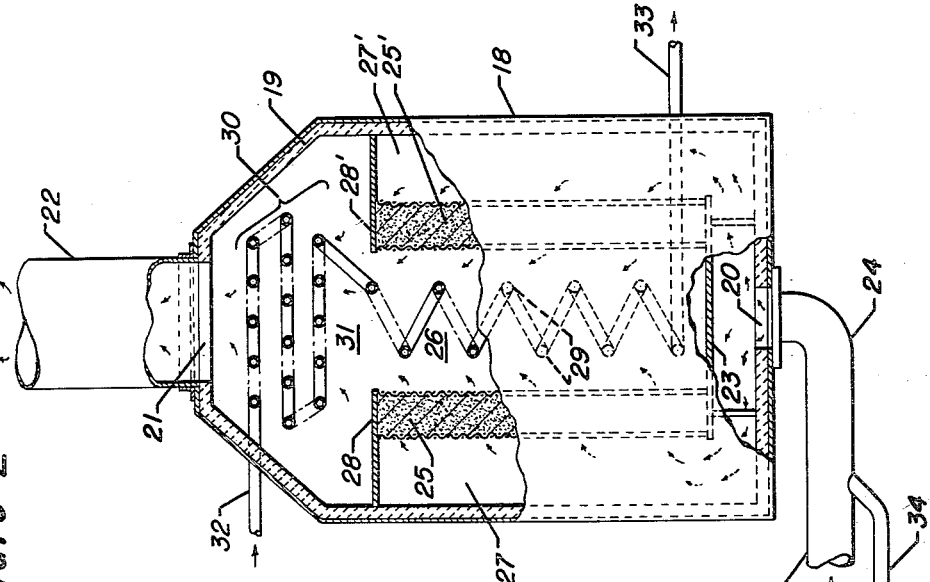

Nov. 12, 1963 K. M. BROWN ETAL 3,110,300
CATALYTIC GAS OXIDIZING AND FLUID HEATING APPARATUS
Filed April 26, 1961 2 Sheets-Sheet 1

INVENTORS:
Kenneth M. Brown
Robert J. J. Hamblin
BY:
Chester J. Giuliani
Philip T. Liggett
ATTORNEYS INVENTORS:
Kenneth M. Brown
Robert J. J. Hamblin
BY: Chester J. Giuliani
Philip T. Liggett
ATTORNEYS

United States Patent Office 3,110,300
Patented Nov. 12, 1963

3,110,300
CATALYTIC GAS OXIDIZING AND FLUID
HEATING APPARATUS
Kenneth M. Brown, Hinsdale, and Robert J. J. Hamblin, Chicago, Ill., assignors to Universal Oil Products Company, Des Plaines, Ill., a corporation of Delaware
Filed Apr. 26, 1961, Ser. No. 105,776
8 Claims. (Cl. 126—109)

This invention relates to a catalytic gas oxidizing and fluid heating apparatus and more particularly to an apparatus design and arrangement adapted to extract heat energy from carbon monoxide in flue gases or from other combustible components in other types of vent gas streams.

Many stacks gas streams have a high temperature that may be advantageously used in heat exchangers or waste heat boilers for steam generation purposes, without supplying additional heat. However, where there is entrained combustible material such as carbon monoxide, hydrogen sulfide, ammonia, hydrocarbons, phenols, etc., there may be effected the catalytic oxidation of such materials to further increase the available heat and the heat transfer to a fluid medium, as well as effect the elimination of noxious fumes. For example, in many refinery operations there are large quantities of flue gas from catalytic cracking regenerators which have a carbon monoxide content of the order of from 5% to 10% by volume. Also in connection with refinery waste water stripping and waste caustic stripping operations, there are resulting vent gases which contain volatilized components that are both oxidizable and noxious in character. The impurities include hydrogen sulfide, ammonia, mercaptans, phenols, oils, etc., and must be incinerated to lessen air pollution.

It is thus a principal object of the present invention to provide an improved form of catalytic incinerator and heating apparatus which effects the extraction of heat energy from vent gas streams carrying oxidizable components with additional air, if required.

It is a further object of the invention to provide a catalytic oxidizer and heater which is adapted to handle vent gas streams carrying entrained particles such as flue gas streams from fluid catalytic cracking regenerators which have a small percentage of entrained catalyst particles that are of a fine dust-like nature.

It is a still further object of the invention to use catalyst elements or sections in the heating apparatus in spaced arrangements providing for radiant heat transmission to adjacent fluid conduit means, such that there is provided both radiant and convection heating to one or more fluid streams being heated within the apparatus.

A particular advantage obtained by the design of a catalytic gas oxidizing and fluid heating apparatus is that the use of catalyst can provide continuous service for many months or years with limited maintenance and only occasional reactivation. Catalysts are also of an advantage in that they save fuel and reduce operating costs by performing combustion operations below normal flame temperatures. In other words, catalysts can effect the production of clean heat from gas streams having too little fuel value to support normal flame combustion.

Varying designs and arrangements may be provided in the use of catalytic beds in connection with a combination oxidizing and heating apparatus; however, in one embodiment the present invention provides in combination, a confined heater housing having a lower gas inlet and an upper treated gas outlet, at least one perforate catalyst retaining unit positioned across the interior of the housing and having at least a major portion of its wall surfaces spaced from the inside walls thereof, a gas distribution section positioned between said gas inlet and on one side of the wall portions of the catalyst unit, a gas collection section positioned on the opposite side of the wall portions of the unit, a gas outlet passageway between the gas collection section and the treated gas outlet, fluid conduit means positioned within said housing and within the gas collection section and the gas outlet passageway, with at least a portion of the fluid conduit means being spaced relatively close to said catalyst retaining unit whereby to obtain radiant heat therefrom, and fluid inlet and outlet means to said fluid conduit means providing thereby means for passing a fluid to be heated through the heating apparatus.

The catalyst retaining unit within the heater housing may comprise, in a simplified embodiment, a single catalyst retaining section formed of spaced perforate plate or screening members such that a bed of catalytic material may be retained therebetween and be available to contact the vent gas stream as it passes through the apparatus. Thus, a single catalyst bed or catalyst section is necessarily positioned either horizontally, vertically, or annularly across the interior of the housing such that the entire flue gas or vent gas stream passes through the retained catalyst in the unit. In another arrangement, two or more wall-like sections, each formed of spaced perforate members having catalyst therebetween, may extend in spaced parallel relationship from one end of the heater housing to the other end such that the gas inlet and outlet sections are spaced on opposing sides of the catalyst retaining walls. The distribution of the vent gas stream may be such that gases pass from the space between the walls laterally through and into spaced sections that are formed between the exterior walls of the catalyst retaining sections and the interior walls of the housing. Conversely, of course, the vent gas stream may be channeled through the housing, by interior baffle means, such that the incoming gas flow will pass exteriorly around the spaced wall-like catalyst retaining sections and then flow laterally therethrough into an open centrally positioned gas collection section, and then upwardly through a gas passageway to the treated gas outlet at the top of the housing. In still another arrangement, a circular housing may be provided and an annular-shaped perforate catalyst retaining section positioned concentrically within the housing.

In all cases at least a portion of the fluid conduit means carrying the fluid to be heated is positioned adjacent to a downstream wall portion or portions of the catalyst retaining section or sections, such that the fluid may be subjected to a radiant heating effect from the heated catalyst within the catalyst retaining units. Additional fluid conduit means may be placed in suitably arranged banks for convection heating within the gas passageway means to the treated gas outlet of the housing. Secondary air to assist in the oxidation reaction carried out in the catalyst bed may generally be introduced into the heater housing by the aspirating effect of the vent gas stream being introduced into the apparatus; however, in some instances it may be desirable to use a blower or a portion of a pressurized air stream from other refinery equipment to supply the necessary air and oxygen content to the catalytic zone under a hydrostatic pressure. Of course, in some applications, secondary air will not be required.

Reference to the accompanying drawing and the following description thereof will serve to better clarify the construction and arrangement of the present improved type of catalytic gas oxidizing and fluid heating apparatus.

Figure 1:
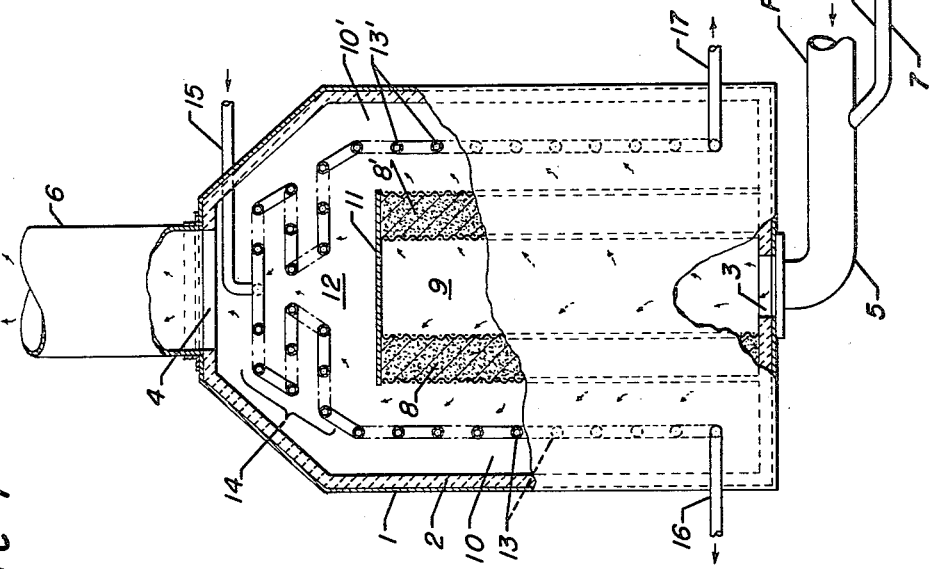

FIGURE 1 of the drawing is an elevational view, partially in section, indicating one embodiment of the apparatus with two spaced radiantly heated fluid conduit sections.

FIGURE 2 of the drawing is an elevational view, partially in section, showing another embodiment where the gas flow provides for a centralized radiantly heated fluid conduit section.

Figure 3:
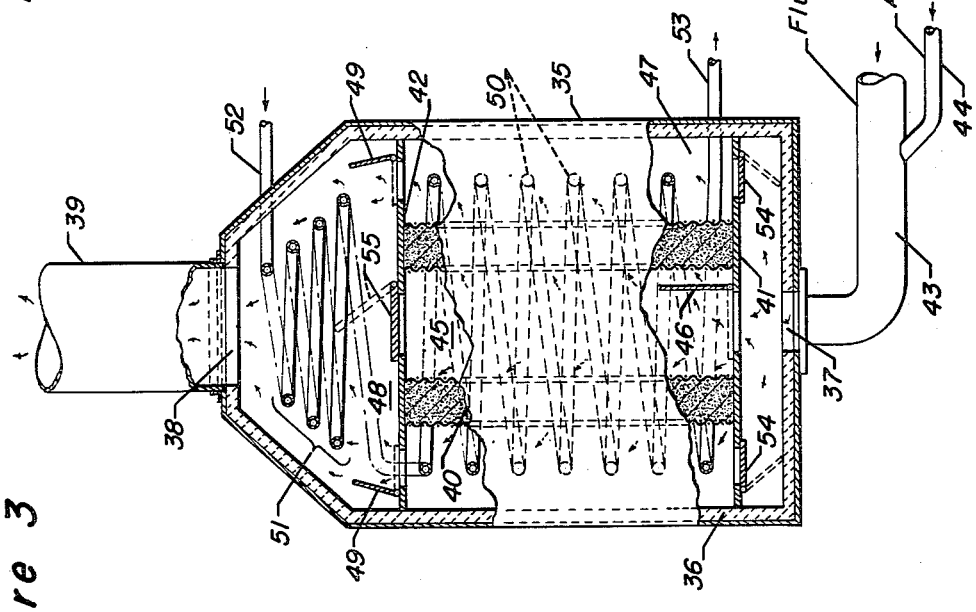

FIGURE 3 of the drawing is an elevational view, partially in section of still another form of the heater that has circular fluid conduit means encompassing an annular-shaped catalyst retaining section concentrically positioned within the housing. The same figure also diagrammatically indicates valving means which provides for reversing the stream flow through the catalyst retaining unit.

Figure 4:
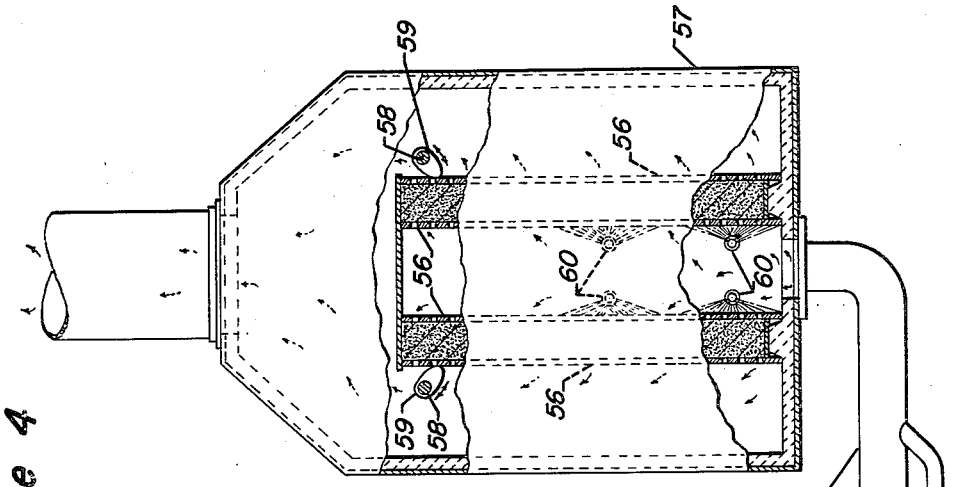

FIGURE 4 of the drawing diagrammatically indicates means for utilizing cams for causing the mechanical rapping of the catalyst retaining unit so as to effect the dislodging of settled foreign matter. The same figure indicates diagrammatically means for utilizing spray means, as exemplified by piping with ports therefrom, which will effect the high pressure cleaning or "blasting" of the surfaces of the catalyst retaining section with jet-like streams of a suitable gaseous medium, whereby settled particles may be dislodged from the catalyst units.

Referring now to FIGURE 1 of the drawing, there is indicated a housing 1 having a suitable refractory liner material 2, a gas inlet opening 3 and a treated gas outlet opening 4. A suitable vent or flue gas inlet conduit 5 connects with the inlet opening 3 while a suitable outlet conduit or stack 6 connects with the outlet 4 at the top of housing 1. The present embodiment provides an air inlet line 7 in connection with flue gas line 5 such that air may be admixed with the gas stream to provide for the oxidation of combustible material entrained therewith. A pair of catalyst retaining sections 8 and 8' extend between the interior ends of the housing in a spaced parallel relationship so as to provide an open gas distributing section 9. The units 8 and 8' also form a pair of spaced gas outlet sections 10 and 10' between the respective side wall portions of housing 1. A suitable partition or baffle member 11 extending across the tops of the catalyst retaining units 8 and 8' provides a top closure to the gas inlet section 9 such that the incoming gas stream is forced to pass laterally through the respective catalyst retaining sections to the spaced outlet sections 10 and 10'. From the latter a treated gas stream passes to the upper portion of the housing 1 and into a gas outlet passageway section 12, within the upper portion of housing 1, and thence to the outlet stack 6.

Each of the catalyst retaining sections has perforate side wall members of high temperature resistant metal or screening such that the gas stream to be treated may readily pass through the calalytic material retained therebetween. The catalytic material retained in the catalyst units 8 and 8' may comprise catalytically activated metal in the form of wire or ribbon formed into a mat. For example, a nickel, chromium, or nickel-chromium alloy catalytically activated by platinum or palladium, or a combination of metals of the platinum group, may be used to provide the desired oxidizing catalyst bed. Reference may be made to the catalytic incinerating element disclosed in the patent to Suter et al., No. 2,648,742, dated November 10, 1953, as a desirable metallic form of catalytic element. A detailed description of this type of incinerating element is believed unnecessary herein inasmuch as it is set forth in the aforesaid patent. Alternatively, the catalytic material in the catalyst retaining units 8 and 8' may comprise a suitable thickness of oxidation catalyst in particulate form. Pills or pellets, in either spherical or non-spherical form, and of a size adapted to be held within the perforate metal retaining walls of the units, may be employed to advantage in the present units.

By way of illustration, suitable oxidation catalysts include the metals and their oxides of groups I, V, VI and VIII of the periodic table, particularly copper, silver, vanadium, chromium, iron, cobalt, nickel, platinum and palladium. These components may be used singly or in combination with two or more, or may be composited with an inorganic refractory oxide such as alumina, silica-alumina, silica-alumina-zirconia, silica-thoria, silica-boria, and the like. In forming a catalyst bed, care should be taken to insure that the catalyst particles are uniformly packed in all portions of the bed in order to provide a resulting bed having a uniform resistance to flow. The bed may also be formed of self-supporting rods, plates, etc., which may be metallic or refractory inorganic oxides.

The quantity of catalyst maintained in the units 8 and 8' is, of course, sufficient to effect the desired substantially complete oxidation of entrained oxidizable components within the vent gas streams passing through the units. The temperature of the catalyst bed during operation will vary in accordance with the quantity of combustible material entrained in the gas stream and may vary in temperature from the order of 500° to 2000° F. Generally, a hot flue gas stream will initiate catalytic activity and oxidation within the bed without the use of an external heat supply. However, where low temperature vent gases are being introduced into the gas oxidizing and heating apparatus, then burner means may be provided for the addition of hot gases to the incoming stream or for the heating of a portion of the catalyst in the retaining units such that an activated portion of a unit will in turn heat adjacent portions thereof and spread the ignition temperatures throughout the bed.

The present embodiment provides a radiantly heated tube bank 13 adjacent one side of the catalyst retaining unit 8 and a separate radiantly heated tube bank 13' adjacent the side of unit 8'. Each of the tube banks 13 and 13' connects with a tube bank 14 which is positioned within the upper gas passageway 12 such that the fluid to be heated will receive convection heating from the hot gas stream prior to its discharge from the housing by way of stack 6. In accordance with a feature of the present invention, the tube banks 13 and 13' are spaced relatively close to the exterior surfaces of the catalyst retaining units 8 and 8' such that they will receive a high proportion of radiant heat energy from the activated units during their use. A fluid inlet line 15 provides means for introducing a fluid to be heated into tube bank 14, while fluid outlet lines 16 and 17 provide means for withdrawing high temperature fluid streams from the respective tube banks 13 and 13'.

In FIGURE 2 of the drawing, there is indicated a modified embodiment of the present invention, with the apparatus being similar in shape to that set forth in FIGURE 1. A housing 18, of a generally rectangular shape, has a suitable refractory liner 19 on the interior thereof and a lower gas inlet 20 providing means for receiving a vent gas stream from line 24. An outlet 21 and stack 22 provides means for discharging a treated gas stream from the housing. A raised floor or platform 23, spaced above inlet 20, provides means for passing a vent gas stream from line 24 into a two-way distribution to the interior side portions 27 and 27' of the housing 18. The floor member 23 also provides means for supporting spaced catalyst retaining units 25 and 25' which extend from one end of the housing to the other and provide an open gas outlet passageway 26 therebetween. At the same time the catalyst retaining units are spaced away from the interior walls of the housing 18 to provide the spaced gas inlet passageways 27 and 27'. Spaced partitions 28 and 28' extend over the latter, between the tops of catalyst retaining units 25 and 25' and the side walls of housing 1, so as to block the upper ends of the gas inlet passageways 27 and 27', thus forcing the gas flow laterally through the catalyst beds and effecting the catalytic oxidation of any oxidizable material entrained therewith. It will be noted in connection with the present embodiment that the gas stream after being catalytically treated is recombined in the central collection zone 26 and that a plurality of radiant heated conduit members 29 spaced therein may be subjected to high temperature radiant heating from the opposing surfaces of the catalyst sections 25 and 25'. A suitable convection heated tube bank 30 is positioned in the upper gas outlet passageway 31 above the catalyst units so that there may be additional heat exchange between the high temperature treated gas stream and a fluid medium passing to the fluid conduits 30. Line 32 provides means for introducing a fluid to be heated to the upper convection tube bank 30 and to the radiant bank 29. Heated fluid is withdrawn from outlet line 33. A suitable quantity of air or oxygen to sustain catalytic oxidation in the unit may be introduced by way of inlet line 34, which is shown connecting with the flue gas or vent gas inlet line 24.

In FIGURE 3 of the drawing there is indicated still another embodiment of the catalytic incinerating and heating apparatus which has means for switching the gas stream flow within the interior of the unit. Specifically there is shown a circular outer housing 35, having a refractory lining material 36, and a lower gas stream inlet 37 connecting with an inlet conduit 43, while an upper gas outlet opening 38 communicates with stack 39. With a cylindrical type of housing, such as shown, a cylindrical or annular-shaped catalyst retaining section 40 may be concentrically positioned on the interior of the housing 35. The catalyst retaining unit 40 may, however, be of a construction similar to the previously described embodiments, having inner and outer walls of perforate sheet metal or screening that are spaced apart in order to hold a desired thickness of catalytic material. The perforate catalyst retaining section provides means for readily passing a gas stream to be treated therethrough from an inlet section 45 to a treated gas outlet section 47.

A cylindrically shaped catalyst section is of advantage in that a single continuous bed of catalytic material may be used to provide an arrangement comparable with the spaced straight wall-like sections indicated in FIGURES 1 and 2. The present embodiment has catalyst section 40 vertically positioned between a lower partitioning means 41 and an upper partitioning means 42. The lower partition 41 is spaced above the bottom of the housing 35 and above the inlet opening 37 such that an incoming gas stream from line 43, together with air from line 44 may be distributed to in turn uniformly contact the catalyst retaining unit in a radial flow.

Where it is desired to have gas stream flow passed to the open central portion 45, then suitable valving means 46 within partition 41 is opened to admit gas flow into the central area and then radially outwardly to the annular gas collection zone 47. The gas collection section 47 connects to, or communicates with a gas passageway 48 in the upper portion of the housing 35 above the catalyst unit. The passageway 48 in turn connects with the outlet stack 39. Adjustable valving means 49 are preferably positioned around the periphery of the upper partition 42 such that there is adequate means for transmitting the flow of treated gas to the outlet passageway and stack. A radiantly heated fluid conduit 50 is positioned in the form of a helical coil adjacent the exterior wall of the catalyst retaining unit 40 and within the treated gas collection zone 47 such that there may be high temperature radiant heating of the fluid passing therethrough. Additional conduit means 51 is provided in the upper portion of the housing within the gas passageway 48 such that there may be convection heating of the fluid stream passing through the coil 51. In the circular form of heater, as illustrated, one or more helical or spiral forms of fluid conduits may be embodied in any particular apparatus to provide the desired fluid conduit means. Where one continuous coil is utilized, a fluid stream to be heated is introduced into the heating apparatus by means of inlet 52 and discharged by way of outlet line 53.

An additional feature to the catalytic gas treating and fluid heating apparatus of the present embodiment is the provision of additional valving means which permits a reversal of the gas stream flow through the catalyst retaining unit. At the lower end of the apparatus, around the periphery of the lower partition 41 are provided a plurality of adjustable valve members 54 which may be mechanically or manually opened to receive the incoming flow of the gas stream to be treated. In other words, by closing the center valve 46 and opening valve members 54 the gas stream will be distributed to the outer annular zone 47 and then flow radially inwardly to the interior gas passageway 45; in which case, the outer adjustable valving means 49 in partition 42 are closed and a centrally located valving means 55 is opened such that the treated gas flow then passes from the inner section 45 to the upper passageway 48 and the outlet stack 39. Although not shown in the drawing, additional conduit fluid means may be positioned within the central section 45 in order to obtain additional heat exchange surface within the apparatus. It is, of course, a particular advantageous feature of this adjustable flow arrangement to provide means for reversing the flow through the catalyst retaining section 40 and obtain optimum use of the unit. Particularly where there are entrained particles in the gas stream to be treated, such as finely divided catalyst particles in the flue gas from a catalyst regenerator, there may be some settling or filling-up of the catalyst unit 40. By periodically reversing flow, a large quantity of the settled particulate matter may be dislodged and removed. Alternative flow of the flue gas stream through the apparatus, as may be provided by proper adjustment of the valving means, thus provides a substantially self-cleaning type of continuous operation of the apparatus. It is to be understood that suitably positioned rods, cables, gearing, etc., may be used in connection with the various valving means, so as to provide the desired opening and closing thereof to effect the reversal in flow. It should be further understood that similar valving means and suitable partitioning may be provided in combination with the square or rectangular form of housing and straight wall-like catalyst retaining sections, such as indicated in FIGURES 1 and 2, without limitation to a circular form of housing and catalyst section.

Mechanical means may also be used in combination with the present type of apparatus to effect the removal of particulate matter that may settle within the catalyst retaining units, rather than switching of the gas stream flow.

In FIGURE 4 of the drawing, there is indicated diagrammatically a catalyst retaining unit 56, within a housing 57, that is adapted to receive mechanical jarring or vibration to in turn effect the dislodgment of the foreign matter. The catalyst unit 56 may be of the type similar to that previously described, while housing 57 with gas inlet means at the bottom end thereof may likewise be constructed in a manner similar to that previously set forth with the other embodiments. There is indicated adjacent the upper end portion of the catalyst retaining section 56 and along the two exterior sides thereof, a pair of shaft members 58, each of which is in turn provided with one or more spaced cam-like projections 59. The latter are placed adjacent to and in contact with catalyst retaining section 56 such that as suitable motive power means is actuated to rotate shaft 58 there will be a mechanical jarring and rapping of the catalyst unit 56 to in turn cause the desired loosening of particles or foreign matter therefrom, whereby such matter may be entrained with the gas stream being treated in the apparatus.

Still another arrangement for dislodging catalyst particles, or other matter, from the catalyst retaining unit 56, is the use of internally placed nozzles or perforate pipe members. The latter may comprise one or more perforate pipe members 60 positioned laterally along wall portions of the catalyst unit 56 and in turn have suitably positioned perforations to cause a jet stream of a gas or fluid to impinge upon the catalyst unit and cause the blasting or high pressure dislodgment of settled matter. The perforate pipes 60 are, of course, connected with a suitable fluid supply line having valving means therein to effect the intermittent operation of fluid flow therethrough. Where desired, other perforate pipe means, or nozzles, may be placed on the exterior side of the catalyst retaining section 56 at suitable points to bring about dislodgment of undesired settled material. Such gas or fluid jet streams may be used in conjunction with mechanical rapping. In other words, the arrangement shown in FIGURE 4 is merely diagrammatic and the present invention should not be limited to the particular construction shown. Fluid conduit means for passing a heat exchange fluid and other appurtenant equipment, including inlet and outlet means to the housing, have not been set forth in the drawing, but may be provided in a manner similar to that which has been set forth in connection with the other described embodiments.

In each instance, the drawings and descriptions have indicated the apparatus to be vertically disposed, however, gas flows may be downward or lateral and the various apparatus arrangements may be oriented to accommodate such varying flows. Also, additional baffling may be utilized to provide a more tortuous flow without departing from the scope of the present invention.

We claim as our invention:

1. A catalytic gas oxidizing-fluid heating apparatus comprising in combination, a confined heater housing having a lower gas inlet and an upper treated gas outlet, at least one wall-like perforate catalyst retaining unit positioned vertically within said housing and spaced from the inside walls thereof, said unit having an encompassed open central section communicating with said gas inlet and forming a gas distribution zone therein, the exterior side wall portions of said unit and the inside walls of said housing forming a gas collection zone communicating with said gas outlet, a baffle member extending across the top of said catalyst retaining unit and providing a top closure for said central section, said baffle member and catalyst retaining unit being spaced a substantial distance below said treated gas outlet to form a gas outlet passageway above the catalyst retaining unit between said gas collection zone and said treated gas outlet, radiantly heated fluid conduit means positioned within said gas collection zone and adjacent the exterior wall portions of said catalyst retaining unit whereby such conduits will receive radiant heat therefrom, additional fluid conduit means within said gas outlet passageway to said treated gas outlet adapted to receive convection heating from the catalytically oxidized gas stream passing through said housing, and fluid inlet and outlet means to said fluid conduit means.

2. The apparatus of claim 1 further characterized in that mechanically movable rapping means is positioned adjacent to and in contact with said catalyst retaining unit whereby the latter may be shaken to remove deposited foreign matter therefrom.

3. The apparatus of claim 1 further characterized in that a blast fluid outlet means is positioned within said housing adjacent one of the sides of the wall portions of said catalyst retaining unit, and jet ports from such fluid outlet means are positioned to impinge against the wall surfaces of said catalyst retaining unit whereby a blast fluid may effect the high velocity removal of deposited foreign matter from said unit.

4. A catalytic gas oxidizing-fluid heating apparatus comprising in combination, a confined heater housing having a lower gas inlet and upper treated gas outlet, at least one wall-like perforate catalyst retaining unit positioned vertically within said housing and spaced from the inside walls thereof, said unit having an encompassed open central section adapted to accommodate a gas flow therethrough, the inside walls of said housing and the exterior side wall portions of said catalyst unit forming a gas distribution zone in the housing, said distribution zone connecting with said gas inlet whereby a gas to be treated may be passed laterally through said catalyst retaining unit, means forming a gas outlet passageway above the catalyst retaining unit and connecting the interior open central section within said catalyst retaining unit to said treated gas outlet, said means comprising partitioning means extending from the top of the catalyst retaining unit to the inside walls of said housing and providing a top closure for said gas distribution zone, radiantly heated fluid conduit means positioned within the open central portion of said catalyst unit adjacent the interior wall portions thereof and adapted to receive radiant heat therefrom, additional fluid conduit means positioned within said gas outlet passageway adapted to receive convection heating from the catalytically oxidized gas stream passing through said housing, and fluid inlet and outlet means to said fluid conduit means.

5. The apparatus of claim 4 further characterized in that mechanically moving rapping means is positioned in contact with said catalyst retaining unit whereby the latter may be shaken to remove deposited foreign matter from said catalyst unit.

6. The apparatus of claim 4 further characterized in that a blast fluid outlet means is positioned within said housing adjacent one of the sides of the wall portions of said catalyst retaining unit and jet ports from such fluid outlet means are positioned to impinge against the wall surfaces of said catalyst retaining unit whereby a blast fluid stream may effect the high velocity removal of deposited foreign matter from said unit.

7. A catalytic gas oxidizing-fluid heating apparatus comprising in combination, a cylindrically shaped housing having a lower gas inlet and an upper treated gas outlet, a perforate catalyst retaining unit of annular shape positioned vertically within said housing and having an open central portion connecting with said gas inlet, said annular shaped catalyst retaining unit being spaced away from the interior wall portion of said housing to form a concentrically positioned radiant heating zone, a radiantly heated fluid tube bank of circular form in the latter zone, partitioning means on the top of the catalyst retaining unit and extending across said housing to form a gas passageway above the catalyst retaining unit and connecting between said radiant heating zone around said catalyst unit and said upper treated gas outlet, additional fluid conduit means within said gas outlet passageway adapted to receive convection heating from the catalytically treated gas stream as it is discharged from said housing, and fluid inlet and outlet means connecting to said fluid conduit means.

8. A catalytic gas oxidizing-fluid heating apparatus comprising in combination, a confined heater housing having a lower gas inlet and an upper treated gas outlet, at least one perforate catalyst retaining unit positioned vertically within said housing and spaced from the inside walls thereof, said unit having an encompassed open central portion within its wall portions adapted to accommodate a gas flow therethrough, said catalyst unit and the interior side wall portion of said housing forming a gas passageway therebetween, means forming a convection heating zone above said catalyst retaining unit and connecting with said treated gas outlet, partitioning means between said gas inlet and said open central portion within said catalyst retaining unit and between said inlet and said gas passageway positioned exteriorly of said catalyst retaining unit, additional partitioning means between said convection heating zone and said open central portion, further partitioning means between said convection heating zone and said gas passageway exteriorly of said catalyst retaining unit, adjustable valving means positioned within each of said partitioning means, radiantly heated fluid conduit means in said exterior gas passageway, additional fluid conduit means in said convection heating zone, and fluid inlet and outlet means to said fluid conduit means, said adjustable valving means in said partitioning means providing a reversible flow whereby gas flow may be channeled by said valving means to pass from said gas inlet to the central portion of said catalyst retaining unit and to said gas passageway exteriorly thereof and thence to said convection heating zone and to said treated gas outlet, and in an alternative flow from said gas inlet to said exterior gas passageway and then through said catalyst unit to the open central portion thereof prior to passing to said convection heating zone and said treated gas outlet.

References Cited in the file of this patent

UNITED STATES PATENTS

| | | |
|---|---|---|
| 1,213,470 | Finlay | Jan. 23, 1917 |
| 1,700,961 | Vaughn | Feb. 5, 1929 |
| 2,137,253 | Thompson | Nov. 22, 1938 |
| 2,183,496 | Peters | Dec. 12, 1939 |
| 2,658,742 | Suter et al. | Nov. 10, 1953 |
| 2,840,043 | Durham | June 24, 1958 |
| 2,898,202 | Houdry et al. | Aug. 4, 1959 |
| 2,946,651 | Houdry | July 26, 1960 |

FOREIGN PATENTS

| | | |
|---|---|---|
| 942,360 | France | Sept. 13, 1948 |
| 1,056,454 | France | Oct. 21, 1953 |